Oct. 2, 1923.

J. W. PETERS

LAWN MOWER

Filed March 2, 1921

1,469,603

2 Sheets-Sheet 1

Inventor

John W. Peters.

Oct. 2, 1923.
J. W. PETERS
LAWN MOWER
Filed March 2, 1921
1,469,603
2 Sheets-Sheet 2
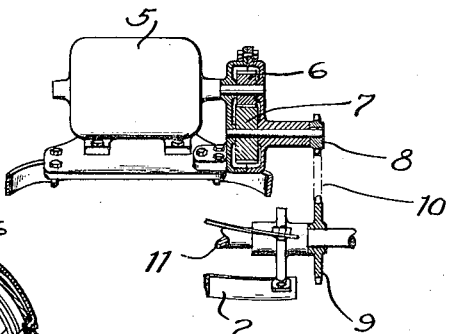
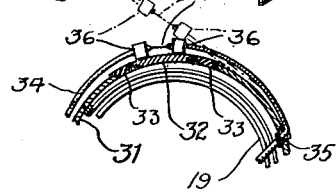
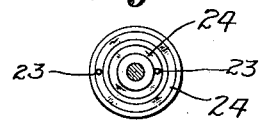
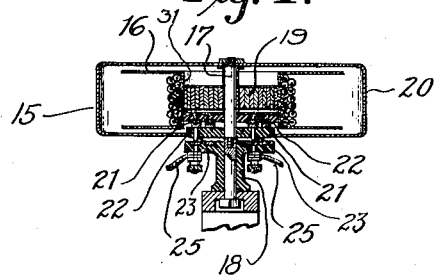
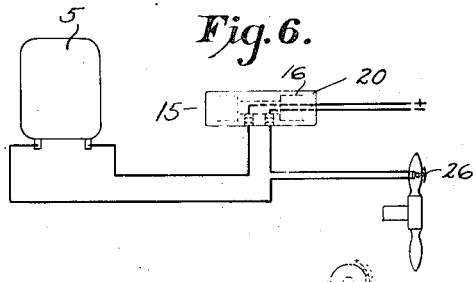
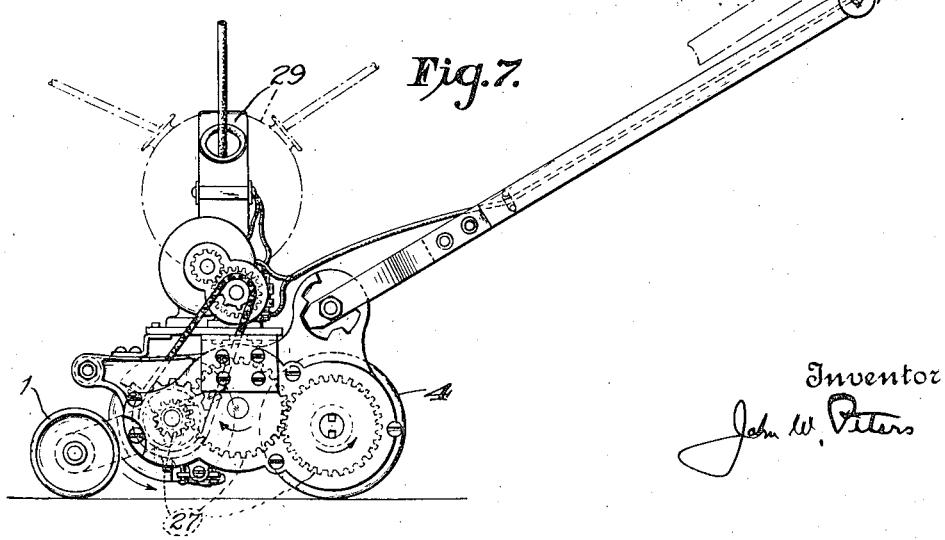
Inventor
John W. Peters Patented Oct. 2, 1923.

1,469,603

UNITED STATES PATENT OFFICE.

JOHN W. PETERS, OF ROSLYN, NEW YORK.

LAWN MOWER.

Application filed March 2, 1921. Serial No. 449,258.

*To all whom it may concern:*

Be it known that I, JOHN W. PETERS, a citizen of the United States, residing at Roslyn, in the county of Nassau and State of New York, have invented certain new and useful Improvements in Lawn Mowers, of which the following is a disclosure.

My invention relates to lawn mowers and has for its object the production of a self-propelled lawn mower so simple and inexpensive and so free from upkeep costs that it may be generally used in place of the ordinary man-propelled mower now commonly employed. With these objects in view I preferably construct the mower frame, the rolls or wheels, and the cutter and knives in the same general way as in the old and well known hand machines. As a source of power I prefer an electric motor and obtain the necessary current from a cable attached at one end to any source of supply, such as the house circuit. The cable is secured at its other end to a self-winding spring reel mounted and swiveled on the mower and which operates to automatically give out and take up the cable as the mower travels on the lawn. In actually constructing devices of this kind I have found a one third horse power motor sufficient to propel and drive the cutter of a twenty-one inch mower, while a reel adapted to accommodate seventy-five feet of cord or cable enables a large area to be cut with one attachment. I have found that with this length of cord the tension on the reel may be made such as to keep the cord free of the ground without imposing undue strains on the mower.

Figure 1:
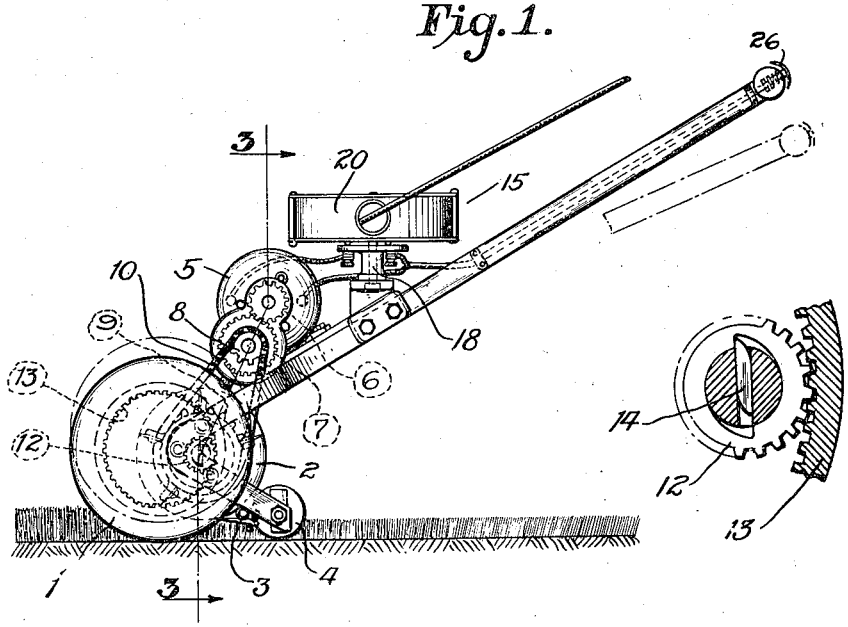
Figure 3:
Figure 2:
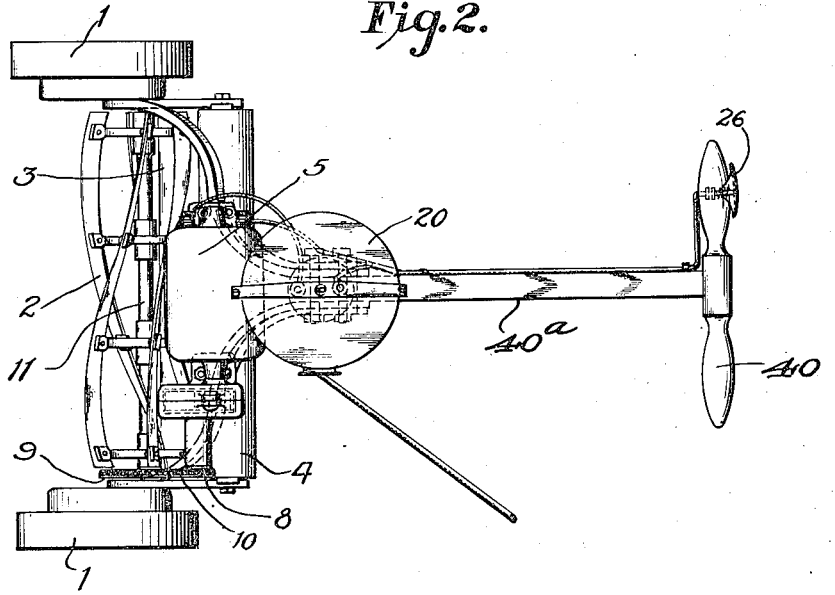

With these preliminary explanations, my invention will readily be understood from a description of the constructions embodying my invention illustrated in the drawings accompanying and forming a part of this specification. In these drawings Fig. 1 is a side elevation of the preferred embodiment of my invention. Fig. 2 is a plan view of the structure shown in Fig. 1. Fig. 3 is a detail view showing the gearing connecting rotatable cutter to driving roller. Fig. 4 is a section view of the reel. Fig. 5 is a detail view of sliding contact forming a part of the reel. Fig. 6 is a wiring diagram. Fig. 7 is a side elevation of a modified construction. Fig. 8 is a detail view showing means for automatically turning off the current when the cable reaches its end on the reel. Fig. 9 is a detail view showing the gearing of the motor to the rotatable cutter or knife.

Referring in detail to the machine illustrated in Figs. 1 to 6, the mower comprises wheels or rollers, 1, a cutter 2, a cutter bar 3, and a rear roller 4, all arranged substantially as in common forms of hand mowers except that the handle is secured rigidly to the frame of the mower and the weight is so balanced on the front and rear rollers or wheels that the front rollers, which operate to propel the device, may be readily lifted from the ground and the machine stopped by tilting the handle down as shown in dotted lines in Fig. 1. The propelling motor is shown at 5 and is arranged to drive the cutter 2 through gears 6 and 7, sprocket wheels 8 and 9, and chain 10. The shaft 11 of the cutter carries pinions 12 at each end which mesh with the gears 13 on the wheels or rollers 1. The pinions 12 are loose on the shaft 11, being driven by the cutter through ratchets 14. Hence it will be seen that in my invention the cutter drives the wheels instead of being driven as in the ordinary hand machines. The ratchets allow the machine to turn corners and to be manually propelled as when taking it to the place where it is to be used. The reel 15 is of the horizontal type and comprises the drum 16 journaled on spindle 17. The latter is fixed at its upper end to the housing 20 and its lower end passes through and turns freely in the standard 18 mounted on the lower end of the mower handle. The spring 19 is secured at one end to the housing 20 and at its other end to the drum 16 and should be of sufficient length and strength to reel up from 50 to 100 feet of light rubber covered twin cord or cable and to hold it above the ground when the machine is in use. The two conductors forming the cable terminate in contacts 21 which contact with slip rings 22. From the latter rings the current passes through contacts 23, slip rings 24 to conductors 25. The latter take the current to the motor, a switch 26 mounted on the handle being inserted in one of the leads in order that the operator may readily turn the power on and off. The switch 26 is mounted on the hand piece 40 at the outer end of the handle bar 40ª so that the operator can readily turn off the current without removing his hand from the machine. This is a great advantage in a machine of this kind due to the frequent stalling of the machine by twigs and the like.

The machine shown in Fig. 7 differs from that above described mainly in that the cutter shaft 11 driven by motor 5 is connected through gears 27 to the rear roller 4 and the machine is propelled by this roller. In order to quickly stop the machine or to be able to freely turn or manipulate it the handle is raised as shown in dotted lines. This lifts the roller 4 from the ground and leaves the machine free to be manipulated on the front rollers 1. The reel 29 in this machine is shown with the drum mounted to turn on a vertical axis, but this arrangement is optional and unimportant.

In both modifications illustrated some means should be provided to turn off the current and stop the motor as the machine reaches the limit of the travel and the cable has substantially all been unwound, in order to prevent damage to the cable or reel. My preferred means for doing this are shown in Fig. 8, where 31 is the core of the reel, 32 is a metal plate insulated from the reel by insulation 33, and 34 is one of the conductors of the cable secured to the reel at 35. The conductor is broken and lugs 36 are secured to the ends. These lugs are connected by insulating cord 37. With this arrangement, when the lugs rest on plate 32, the cable circuit is closed, but when the cable reels out and approaches its end so that the lugs are raised as shown in dotted lines, the current is turned off and the machine stopped. It will be noted that the reel, in both arrangements illustrated, is mounted at or near the lower end of the handle bar and is swivelled to swing freely. It is important that the reel be mounted low because the pull on the cable is sufficient to make the handling of the machine troublesome if the reel is elevated so as to get it above the head of the operator. I prefer to mount it directly above the machine, as shown in Fig. 7.

Having thus described my invention, what I claim is:

1. A lawn mower comprising a frame, a propelling wheel, a handle extending rearwardly therefrom whereby the operator may steer the machine, an electric motor connected with and adapted to propel the mower, means for supplying current to said motor comprising a self winding reel mounted on the mower and a cable comprising two conductors wound on said reel with its free end extending to a source of current supply.

2. A lawn mower comprising a frame, wheels supporting said frame, an electric driving motor, a handle bar secured at one end to the frame and provided with a hand piece at its outer end, a self retracting reel mounted on the mower adjacent to the lower end of the handle, a supply cable carried on the reel and controlling means adapted to start and stop the mower mounted at the hand piece.

3. A lawn mower, an electric motor connected with and adapted to propel the mower, means for supplying current to said motor comprising a self-winding reel mounted on the mower and a cable comprising two insulated conductors wound on said reel with its free end extending to a source of current supply and means for breaking the current supply to the propelling motor before the cable has entirely unwound from the reel.

4. A lawn mower comprising an electric motor connected with and adapted to propel the mower, means for supplying current to said motor comprising a reel mounted on the mower, a cable wound on said reel with its free end extending to the source of current supply, a hand piece for steering the mower, and controlling means adapted to start and stop the mower mounted on the hand piece.

5. A lawn mower, an electric motor connected with and adapted to propel the mower, means for supplying current to said motor comprising a self-winding reel mounted on the mower and a cable consisting of two insulated conductors wound on said reel with its free end extending to a fixed source of current supply and means operating to break the current supply to the propelling motor before the cable has entirely unwound from the reel.

6. A lawn mower comprising a frame, wheels supporting said frame, an electric driving motor, a handle bar secured at one end to the frame and provided with a hand piece at its outer end, a self-retracting reel mounted on the mower adjacent the lower end of the handle and swivelled to turn freely in a horizontal direction, and a supply cable carried on said reel.

JOHN W. PETERS.